United States Patent
Howard et al.

(10) Patent No.: US 9,556,921 B2
(45) Date of Patent: *Jan. 31, 2017

(54) AIR SPRING SLEEVE

(71) Applicant: FIRESTONE INDUSTRIAL PRODUCTS COMPANY, LLC, Indianapolis, IN (US)

(72) Inventors: Michael C. Howard, Noblesville, IN (US); Hao Wang, Carmel, IN (US); Sheel Agarwal, Stow, OH (US); John D. Rensel, Tallmadge, OH (US)

(73) Assignee: FIRESTONE INDUSTRIAL PRODUCTS COMPANY, LLC, Indianapolisi, IN (US)

( * ) Notice: Subject to any disclaimer, the term of this patent is extended or adjusted under 35 U.S.C. 154(b) by 102 days.

This patent is subject to a terminal disclaimer.

(21) Appl. No.: 14/337,294

(22) Filed: Jul. 22, 2014

(65) Prior Publication Data

US 2014/0333016 A1     Nov. 13, 2014

Related U.S. Application Data

(63) Continuation of application No. 11/598,710, filed on Nov. 14, 2006, now Pat. No. 8,800,974.

(51) Int. Cl.
| | | |
|---|---|---|
| *F16F 9/04* | (2006.01) | |
| *F16F 9/05* | (2006.01) | |
| *F16F 5/00* | (2006.01) | |

(52) U.S. Cl.
CPC ............. *F16F 9/0409* (2013.01); *F16F 9/05* (2013.01); *F16F 2224/025* (2013.01)

(58) Field of Classification Search
CPC ....... F16F 9/0409; F16F 9/05; F16F 2224/025

USPC ......... 267/64.11, 64.19, 64.21, 64.23, 64.24, 267/64.27

See application file for complete search history.

(56) References Cited

U.S. PATENT DOCUMENTS

| | | |
|---|---|---|
| 3,319,952 A | 5/1967 | Georges |
| 3,584,845 A | 6/1971 | Hoffman |
| 3,603,350 A | 9/1971 | Monroe |

(Continued)

FOREIGN PATENT DOCUMENTS

| | | |
|---|---|---|
| EP | 0529435 A | 3/1993 |
| EP | 1484525 A | 12/2004 |

(Continued)

OTHER PUBLICATIONS

International Application No. PCT/US2007/023770, International search report Mar. 6, 2008.
Babbit, et al. Vanderbuilt Rubber Handbook, pp. 344-346 (1978).

*Primary Examiner* — Melody Burch
(74) *Attorney, Agent, or Firm* — Tom Kingsbury; Arthur M. Reginelli

(57) ABSTRACT

The present invention is directed to an air spring sleeve comprising: an outer layer, at least one reinforcing layer, and an inner layer that form the sleeve; the outer layer and the inner layer are formed of an elastomeric composition, with the proviso that the elastomeric composition does not comprise epichlorohydrin; and the at least one reinforcing layer comprises a plurality of reinforcing elements disposed between a layer of the elastomeric composition, wherein the elastomeric composition of the at least one reinforcing layer is identical to the elastomeric composition of the outer layer and the inner layer.

22 Claims, 3 Drawing Sheets

(56) References Cited

U.S. PATENT DOCUMENTS

| | | | |
|---|---|---|---|
| 4,412,965 A * | 11/1983 | Thompson | B29C 45/14778 |
| | | | 156/117 |
| 4,505,971 A | 3/1985 | Martin, Jr. | |
| 4,763,883 A | 8/1988 | Crabtree | |
| 5,080,328 A | 1/1992 | Pees | |
| 5,374,037 A | 12/1994 | Bledsoe | |
| 5,554,699 A | 9/1996 | Layer et al. | |
| 5,566,929 A | 10/1996 | Thurow | |
| 5,707,045 A | 1/1998 | Easter | |
| 6,264,178 B1 | 7/2001 | Schisler et al. | |
| 6,619,635 B1 | 9/2003 | Hilburger et al. | |
| 6,719,279 B1 | 4/2004 | Koch et al. | |
| 8,800,974 B2 * | 8/2014 | Howard | F16F 9/0409 |
| | | | 267/64.19 |
| 2004/0038039 A1 | 2/2004 | Sandland | |
| 2004/0242795 A1 | 12/2004 | Waddell et al. | |
| 2004/0248485 A1 | 12/2004 | Kerstetter, III | |
| 2005/0084638 A1 | 4/2005 | Kerstetter, III et al. | |
| 2006/0131797 A1 | 6/2006 | Kerstetter et al. | |
| 2007/0205545 A1 | 9/2007 | Thurow et al. | |

FOREIGN PATENT DOCUMENTS

| | | | |
|---|---|---|---|
| EP | 1524293 A | 4/2005 |
| JP | 55166540 A | 12/1980 |
| JP | 2001220425 A | 8/2001 |
| WO | 2005098261 A1 | 10/2005 |

* cited by examiner

AIR SPRING SLEEVE

This application is a continuation application of U.S. Non-Provisional application Ser. No. 11/598,710, filed Nov. 14, 2006, now U.S. Pat. No. 8,800,974, which is incorporated herein by reference.

The present invention relates to an air spring sleeve, and more particularly to an air spring sleeve comprising: an outer layer, at least one reinforcing layer, and an inner layer forming the sleeve; wherein the outer layer and the inner layer are formed from an elastomeric composition, with the proviso that the elastomeric composition does not comprise epichlorohydrin; and wherein the at least one reinforcing layer comprises a plurality of reinforcing elements disposed between a layer of the elastomeric composition, wherein the elastomeric composition of the at least one reinforcing layer is identical to the elastomeric composition of the outer layer and the inner layer.

Air springs are typically used in vehicular and industrial applications. In those applications, the air spring can serve, for example, to reduce road damage, to stabilize a vehicle, to reduce motion and/or vibration, to support a load, and/or to enable adjustments for driving conditions.

Air springs typically include two end members which are connected to respective ends of an air sleeve. The air sleeve can be composed of a fabric reinforced flexible bladder or sleeve. The air spring sleeve usually has opposed open ends which are connected to the end members by, for example, a clamp or swage ring to form a pressurized chamber within the sleeve. The flexible sleeve usually consists of inner and outer layers of a non-reinforced elastomeric material with a plurality of reinforcing schemes creating reinforcing layers sandwiched between these inner and outer layers or combinations thereof.

The inner layer, the reinforcing layer and the outer layer are typically made from a flexible material. The modulus of the flexible material of the air sleeve should be low enough to continuously flex as the air spring moves from extended to compressed positions without deteriorating to provide a durable air spring. To achieve that flexibility and durability, the art teaches a number of different sleeve constructions as well as sleeve compositions.

For example, the inner layer may be a particular elastomeric composition, while the outer layer may be of a different elastomeric composition. The use of different elastomeric compositions for the inner and outer layers, however, creates a stress discontinuity between the different layers of the air sleeve including the reinforcing layers. In addition, the use of a different rubber composition for each layer adds to the complexity of manufacturing the air sleeve.

U.S. Pat. No. 4,763,883 discloses an air spring bellows construction wherein the bellows is formed of elastomeric material and reinforced with embedded fiber cords. Successive layers of cord are wound in annular bands, either in the rolling lobe or in the chamber portion, in combination with helical windings to change angles of the cord material. That provides an air spring design that compromises the spring rate effect of a piston entering a chamber and increases the effective diameter of an air spring without substantially increasing its volume. In addition, U.S. Pat. No. 5,566,929 describes the use of three rubberized cord fabric layers to generate a longer service life at higher inner pressures and small roll-off radii in the rolling lobe.

Moreover, U.S. Patent Application Publication Nos. 2004/0248485 and 2005/0084638 are directed to particular plycoats that encompass reinforcement cords in an effort, inter alia, to obtain high resistance to deterioration of the bond with flexing of the air spring.

Instead of altering the composition of the sleeve layer or adding particular reinforcing plies, the present inventors have discovered that a single rubber composition can be used throughout all the layers of the sleeve. In fact, epichlorohydrin rubber air springs on the market can use the same compositional layers generating the air sleeve. Epichlorohydrin rubber, however, has inherent properties and limitations that would not suggest that other rubber compositions could be used in a similar manner. Thus, it is desirable to use a single composition for all layers of an air spring sleeve, i.e., the inner layer, the reinforcing layer and the outer layer, wherein the composition does not include epichlorohydrin rubber. By using a single rubber composition, not only can manufacturing costs be reduced but also the degree of complexity in the manufacturing process is reduced.

The present invention is directed to an air spring sleeve comprising: an outer layer, at least one reinforcing layer, and an inner layer forming the sleeve; wherein the outer layer and the inner layer are formed of an elastomeric composition, with the proviso that the elastomeric composition does not comprise epichlorohydrin; and wherein the at least one reinforcing layer comprises a plurality of reinforcing elements disposed between a layer of the elastomeric composition, wherein the elastomeric composition of the at least one reinforcing layer is identical to the elastomeric composition of the outer layer and the inner layer.

Additional advantages of the present invention will be set forth in part in the description which follows, and in part will be obvious from the description, or may be learned by practice of the present invention. The advantages of the present invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the present invention and together with the description, serve to explain the principles of the present invention.

DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
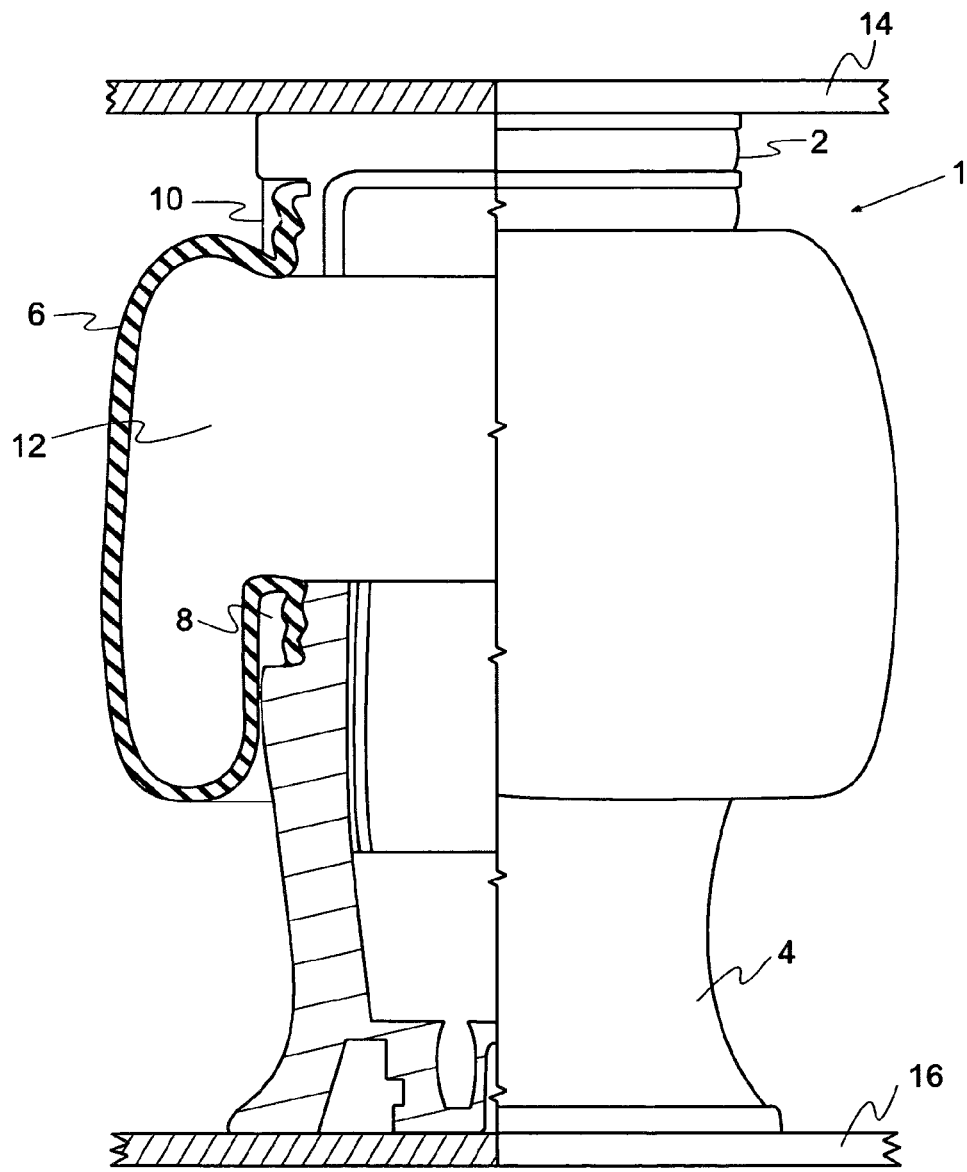
FIG. 1 is an schematic view of an air spring having an air sleeve.

At least one embodiment of an air spring according to the present invention is shown in FIG. 1 and is indicated generally at 1. The air spring 1 can be any conventional air spring known to the art and to the literature such as a reversible sleeve or convoluted spring, e.g., single, double or triple convoluted.

As shown in FIG. 1, air spring 1 includes a top end member 2 and a bottom end member 4 which is depicted as a usual piston. The air spring sleeve, which is indicated generally at 6, is an elongated tubular member which extends between end members 2 and 4 and can be attached, e.g., by a sealing clamp, thereagainst by swage rings 8 and 10 respectively, and forms an internal pressure chamber 12 therein. End members 2 and 4 are attached to two spaced members 14 and 16 respectively, which may be parts of a motor vehicle, such as a vehicle chassis and vehicle axle, or any device where, e.g., cushioning is desired between two spaced members such as in an industrial application.

Figure 2:
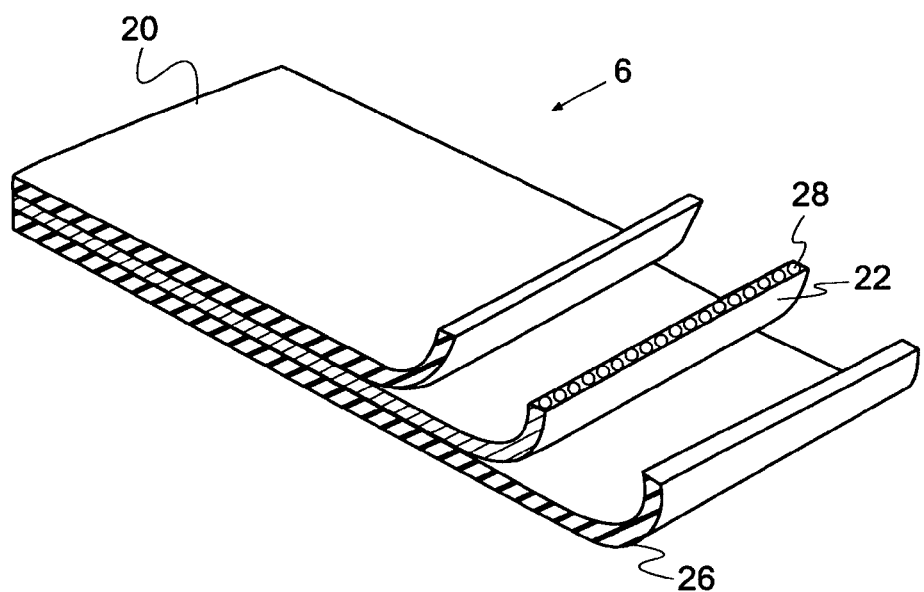
FIG. 2 is a sectional view showing the construction of an embodiment of the present invention.
Figure 3:
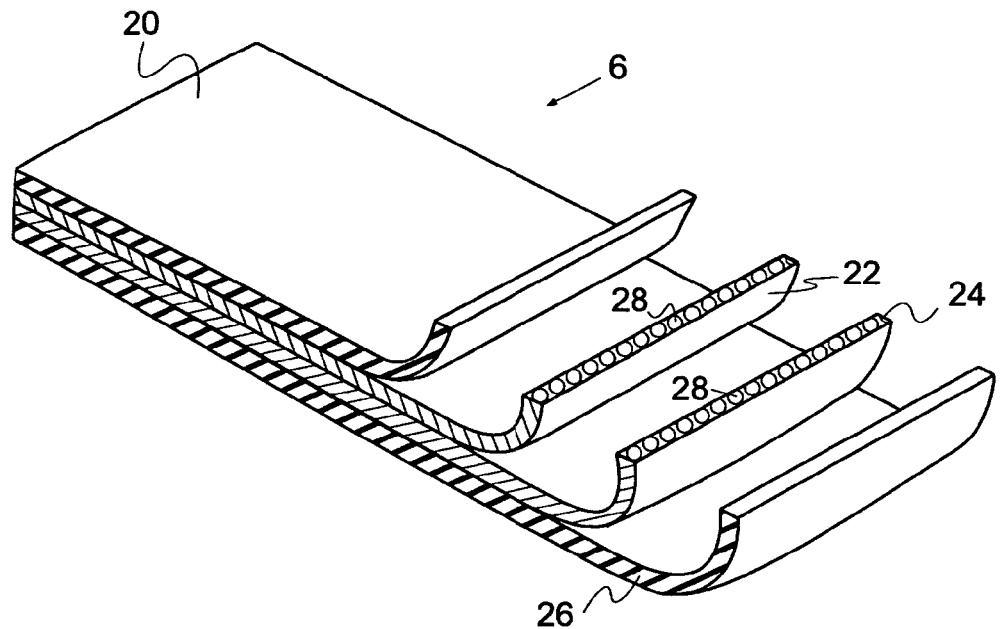
FIG. 3 is a sectional view showing the construction of a further embodiment of the present invention.
Figure 4:
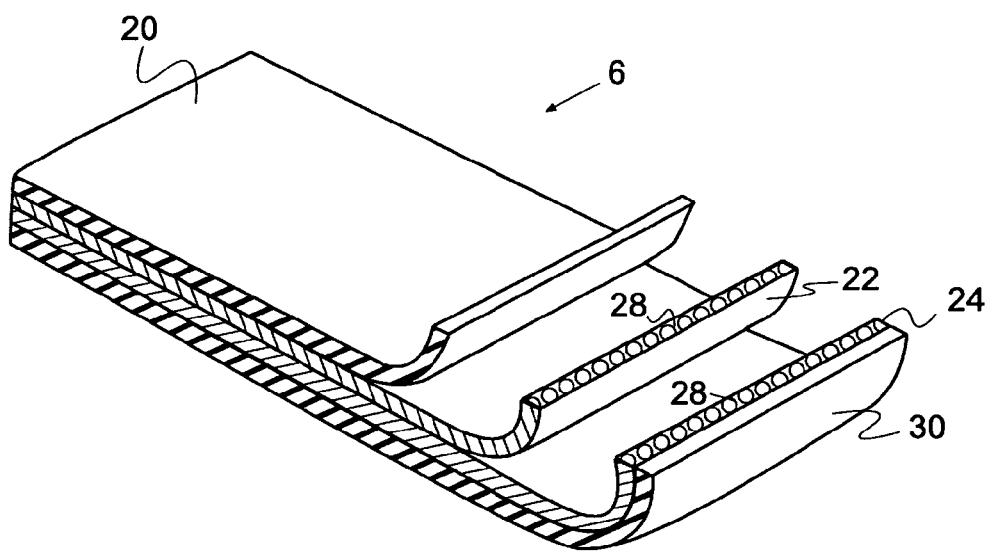
FIG. 4 is a sectional view showing the construction of yet a further embodiment of the present invention.

As shown in FIGS. 2-4, sleeve 6 is formed of inner and outer layers 20 and 26 respectively, which extend generally throughout the axial length of the air sleeve along with at least one reinforcing layer 22 disposed within. Inner layer 20 and outer layer 26 are formed from an elastomeric composition. The at least one reinforcing layer 22 comprises a plurality of reinforcing elements or cords 28 calendered within a thin layer of the elastomeric composition.

As used herein, "elastomeric composition" refers solely to the at least one vulcanized rubber used to make the inner layer, the outer layer, and/or the at least one reinforcing layer. The vulcanized rubber can be chosen from, but not limited to, synthetic polyisoprene rubber, natural rubber (NR), styrene/butadiene rubber (SBR), polybutadiene, polybutadiene rubber (BR), neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), chlorinated polyethylene rubbers, chlorosulfonated polyethylene rubbers, hydrogenated nitrile rubber, tetrafluoroethylene/propylene rubber and the like, with the proviso that the elastomeric composition does not comprise epichlorohydrin. Those vulcanized rubbers allow for the production of a reversible sleeve and/or convoluted spring. In certain embodiments, the elastomeric composition comprises at least two vulcanized rubbers.

The outer layer, the inner layer, and/or the at least one reinforcing layer can further comprise at least one optional ingredient generally known in the rubber compounding art such as, but not limited to, curing aids, activators, retarders, plasticizers, processing oils, resins, reinforcing resins, tackifying agents, fillers, pigments, fatty acids, zinc oxide, magnesium oxide, waxes, peptizing agents, any other additive know in the art, or mixtures thereof. Those ingredients may be present in conventional amounts, as known in the art.

It is readily understood by those having skill in the art that the elastomeric composition would be compounded by methods generally known in the rubber compounding art, such as mixing various sulfur-vulcanizable constituent polymer(s) with various commonly used additive materials such as for example, curing aids, such as soluble sulfur and/or insoluble sulfur, activators, retarders and accelerators, processing additives, such as oils and pine tar, resins, including tackifying resins, plasticizers, pigments, fillers, fatty acid, zinc oxide, waxes, stabilizers such as sterically hindered amines, anti-scorching agents such as N-cyclohexylthiophthalimide, antioxidants and antiozonants, peptizing agents. As known to those skilled in the art, depending on the intended use of the vulcanized composition, the additives mentioned above are selected and commonly used in conventional amounts.

Typical amounts of tackifer resins, if used, comprise from about 0.5 to about 10 phr, usually from about 1 to about 5 phr. Typical amounts of processing aids comprise from about 1 to about 50 phr. Such processing aids can include, for example, aromatic, naphthenic, and/or paraffinic processing oils. Typical amounts of antioxidants, if used, comprise from about 1 to about 5 phr. Representative antioxidants may be, for example diphenyl-p-phenylenediamine and others, such as for example, those disclosed in the Vanderbilt Rubber Handbook (1978), pages 344-346. Typical amounts of antiozonants, if used, comprise from about 1 to about 5 phr.

As used herein, the term "phr" refers to parts by weight of a respective material such as per 100 parts by weight of rubber, or elastomer.

Typical amounts of fatty acids, if used, which can include for example, stearic acid, palmitic acid, linoleic acid or mixtures of one or more fatty acids, comprise from about 0.5 to about 3 phr. Typical amounts of zinc oxide, if used, comprise from about 2 to about 5 phr. Typical amounts of waxes, if used, comprise from about 1 to about 5 phr. In certain embodiments, microcrystalline waxes can be used. Typical amounts of peptizers, if used, comprise from about 0.1 to about 1 phr. Typical peptizers can include, for example, pentachlorothiophenol and dibenzamidodiphenyl disulfide.

The vulcanization is generally conducted in the presence of a sulfur vulcanizing agent. Examples of suitable sulfur vulcanizing agents include, but are limited to, "rubbermaker's" soluble sulfur, sulfur donating vulcanizing agents, such as an amine disulfide, polymeric polysulfide or sulfur olefin adducts; and insoluble polymeric sulfur. For example, the sulfur vulcanizing agent can be soluble sulfur or mixtures of soluble and insoluble polymeric sulfur. The sulfur vulcanizing agents can be used in an amount ranging from about 0.1 to about 10 phr, such as from about 0.5 to about 5 phr, and from about 1.5 to about 3.5 phr.

Accelerators can be used to control the time and/or temperature required for vulcanization and to improve properties of the vulcanizate. The vulcanization accelerators that can be used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenyl guanidine and the like. The amount of the vulcanization accelerator used can range from about 0.1 to about 5 phr, such as from about 0.2 to about 3 phr.

The vulcanizable composition of the present invention can be obtained by mixing the components by using a milling apparatus, such as a mill, an internal mixer, and the like. The ingredients are typically mixed in two or more stages, consisting of at least a "master batch" stage in which at least a portion of the polymeric sulfide compound, silica, carbon black, and other ingredients are mixed at a high temperature, which may be from about 165° C. to about 200° C., and a lower temperature "final stage", in which the curing agents are typically added. There may also be intermediate mixing stages in which the mixture is re-milled with or without the addition of ingredients. The mixing temperature and mixing times may vary from stage to stage, as is known to those skilled in the art.

In one embodiment, at least one reinforcing layer 22 and/or at least two reinforcing layers 22 and 24, as illustrated in FIGS. 2 and 3, can be disposed between inner and outer layers 20 and 26 and extend throughout the axial length of the air spring. Those layers 22 and 24 are of a usual construction consisting of a plurality of reinforcing elements or cords 28 calendered within a thin layer of the elastomeric material, as described above. In usual air spring constructions, the cords will be at a bias angle and opposed to each other in the two reinforcing plies.

In addition, the at least one reinforcing layer should be able to provide two dimensional enforcement. For example, with a single reinforcing layer, the number and arrangement of reinforcing elements or chords can provide such enforcement.

In at least one embodiment of the present invention and illustrated in FIG. 4, the pair of reinforcing layers 22 and 24 are disposed between an inner layer 20 and a cover layer 30 and extend throughout the axial length of the air spring. The outer layer 26 and the cover layer 30 may or may not be the same. For example, the sleeve can include an inner layer, at least two reinforcing layers, and outer layer or cover, respectively. Alternatively, the sleeve can include an inner layer, at least two reinforcing layers, an outer layer, and a cover, respectively.

Before any processing, i.e., before layers of the air spring are cured, the overall thickness of the sleeve can range from about 0.08 inches to about 0.50 inches, such as from about 0.10 inches to 0.25 inches, and further for example, from about 0.21 inches to about 0.25 inches. In some embodiments, the inner layer of the air spring can range in thickness from about 0.02 inches to about 0.12 inches, or any fraction in between. A reinforcing layer with two layers can range in thickness from about 0.02 inches to about 0.15 inches, or any fraction in between. The outer layer can range in thickness from about 0.02 inches to about 0.12 inches, or any fraction in between. The range in thickness of the layers of an air spring can vary based at least in part on, e.g., the type of air spring, the number of layers comprising the air spring, and/or the end function of the air spring. Once the layers of the air spring sleeve are cured, the thickness of the sleeve can range from about 0.06 inches to about 0.49 inches, or any fraction in between.

In one embodiment, the present invention contemplates a four layered sleeve or a three-layered sleeve. For example, in the four layered sleeve, the inner layer is disposed on one side by two reinforcing layers. This is done by passing them through a building machine, which has a series of rollers or drums that stack the individual layers on top of each other for curing. With one of the reinforcing layers, it can pass between the middle rollers, while the inner layer is fed from above and the second reinforcing layer is fed from below. Meanwhile, another roller has the inner layer wrapped around another drum. At this time, the reinforcing layers can be disposed at bias angles. Once the layers are stacked on top of each other, they are desleeved, placed into a press and cured. After that curing, components can be added such as the bead wire, piston, and bead plate to form a finished air spring.

In a three layered sleeve, one of the reinforcing layers is separately manufactured to the outer layer or cover to form an off balance skim. This way the sleeve can be manufactured as described above but with the inner layer, the other reinforcing layer and the off balanced skim reinforcing layer, as provided in FIG. 4.

Accordingly, by providing an air spring sleeve with the same rubber composition in each of the respective layers (i.e., the inner, reinforcing and outer layers), the complexity of the manufacturing process as well as the compounding process are reduced. That can result in time and monetary savings. It also enables the tooling used to assemble the air springs to be utilized in a more efficient manner because regardless of the layer, the same rubber material can be used.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for preparing an air spring sleeve, the method comprising the steps of:
preparing an outer layer, an inner layer, and at least one reinforcing layer, where said layers are each formed from an identical composition, and where said composition comprises one or more sulfur-vulcanizable rubbers excluding epichlorohydrin, and from about 1.5 to about 3.5 parts by weight sulfur vulcanizing agent, per hundred parts rubber, where the composition does not include epichlorohydrin;
disposing the one or more reinforcing layers between the inner layer and the outer layer to form a sleeve; and
at least partially curing the sleeve.

2. The method of claim 1, where the one or more sulfur-vulcanizable rubbers are selected from the group consisting of polyisoprene rubber, natural rubber, styrene/butadiene rubber, polybutadiene, polybutadiene rubber, neoprene, ethylene/propylene rubber, ethylene/propylene/diene rubber, acrylonitrile/butadiene rubber, silicone rubber, fluoroelastomer, ethyleneacrylic rubber, ethylene vinyl acetate copolymer, chlorinated polyethylene rubber, chlorosulfonated polyethylene rubber, hydrogenated nitrile rubber, and tetrafluoroethylene/propylene rubber.

3. The method of claim 1, where the composition further comprises at least one ingredient selected from the group consisting of curing agents, cure activators, retarders, plasticizes, processing oils, resins, reinforcing resins, tackifying agents, fillers, pigments, fatty acids, zinc oxide, magnesium oxide, waxes, peptizing agents, and combinations thereof.

4. The method of claim 1, where the composition further comprises from about 1 to about 5 parts by weight of antiozonant.

5. The method of claim 1, where the composition further comprises from about 0.5 to about 3 parts by weight fatty acids, per hundred parts rubber.

6. The method of claim 1, where the composition further comprises from about 2 to about 5 parts by weight zinc oxide, per hundred parts rubber.

7. The method of claim 1, where the composition further comprises from about 0.1 to about 5 parts by weight vulcanization accelerator, per hundred parts rubber.

8. The method of claim 1, where the composition further comprises from about 1 to about 5 parts by weight wax, per hundred parts rubber.

9. The method of claim 1, where the composition further comprises from about 0.5 to about 10 parts by weight tackifier resin, per hundred parts rubber.

10. The method of claim 1, where the composition further comprises from about 1 to about 50 parts by weight of one or more processing aids selected from the group consisting of aromatic processing oils, naphthenic processing oils, and paraffinic processing oils, per hundred parts rubber.

11. The method of claim 1, where the outer layer, the at least one reinforcing layer, and the inner layer are calendered to form the sleeve.

12. The method of claim 11, where the outer layer is calendered to at least one reinforcing layer, and the inner layer is calendered to at least one reinforcing layer.

13. The method of claim 12, where the sleeve comprises at least two reinforcing layers.

14. The method of claim 1, where the reinforcing layer includes reinforcing elements, and where the reinforcing elements are at a bias angle.

15. The method of claim 1, where the cured sleeve has a thickness of from about 0.06 inches to about 0.49 inches.

16. The method of claim 1, where the air spring sleeve is an elongated tubular member of an air spring, where the air spring includes a top end member and a bottom end member, and where the sleeve extends between the end members.

17. The method of claim 1, where the composition comprises the vulcanized residue of at least polybutadiene rubber, natural rubber, and styrene/butadiene rubber.

18. A method for preparing an air spring sleeve, the method comprising the steps of:
preparing an outer layer, an inner layer, and at least one reinforcing layer, where said layers are each formed from an identical composition, where said composition is prepared by combining:
one or more sulfur-vulcanizable rubbers excluding epichlorohydrin,
from about 1.5 to about 3.5 parts by weight sulfur vulcanizing agent, per hundred parts rubber,
from about 1 to about 5 parts by weight antiozonant, per hundred parts rubber,
from about 0.5 to about 10 parts by weight tackifier resin, per hundred parts rubber, where the composition comprises from about 1 to about 50 parts by weight of one or more processing aids selected from the group consisting of aromatic processing oils, naphthenic processing oils, and paraffinic processing oils, per hundred parts rubber,
from about 0.5 to about 3 parts by weight fatty acids, per hundred parts rubber,
from about 2 to about 5 parts by weight zinc oxide, per hundred parts rubber,
from about 0.1 to about 5 parts by weight vulcanization accelerator, per hundred parts rubber, and
from about 1 to about 5 parts by weight wax, per hundred parts rubber;
disposing the one or more reinforcing layers between an inner layer and an outer layer to form a sleeve, where the outer layer, inner layer, and one or more reinforcing layers comprise said composition; and
at least partially curing the sleeve.

19. A method for preparing an air spring sleeve, the method comprising the steps of:
preparing an outer layer, an inner layer, and at least one reinforcing layer, where said layers are each formed from an identical composition, and where said composition comprises one or more sulfur-vulcanizable rubbers, and at least 1.5 parts by weight, per hundred parts rubber, of a sulfur vulcanizing agent that is selected from the group consisting of soluble sulfur, sulfur donating vulcanizing agents, and insoluble polymeric sulfur, where the composition does not include epichlorohydrin;
disposing the one or more reinforcing layers between the inner layer and the outer layer to form a sleeve; and
at least partially curing the sleeve.

20. The method of claim 19, where the sulfur donating vulcanizing agent is selected from the group consisting of amine disulfide, polymeric polysulfide, sulfur olefin adducts, and combinations thereof.

21. A method for preparing an air spring sleeve, the method comprising the steps of:
preparing a composition comprising at least two members of the group consisting of polyisoprene rubber, natural rubber, styrene/butadiene rubber, polybutadiene, polybutadiene rubber, neoprene, ethylene/propylene rubber, ethylene/propylene/diene rubber, acrylonitrile/butadiene rubber, silicone rubber, fluoroelastomer, ethyleneacrylic rubber, ethylene vinyl acetate copolymer, chlorinated polyethylene rubber, chlorosulfonated polyethylene rubber, hydrogenated nitrile rubber, and tetrafluoroethylene/propylene rubber, and at least 1.5 parts by weight, per hundred parts rubber, of a sulfur vulcanizing agent that is selected from the group consisting of soluble sulfur, sulfur donating vulcanizing agents, and insoluble polymeric sulfur, where the composition does not include epichlorohydrin;
preparing one or more reinforcing layers by calendering a plurality of reinforcing elements or cords within a thin layer of the composition;
disposing the one or more reinforcing layers between an inner layer and an outer layer to form a sleeve, where the outer layer, inner layer, and one or more reinforcing layers comprise said composition; and
at least partially curing the sleeve.

22. The method of claim 21, where the sulfur donating vulcanizing agent is selected from the group consisting of amine disulfide, polymeric polysulfide, sulfur olefin adducts, and combinations thereof.

* * * * *